(12) United States Patent
Sone (10) Patent No.: US 11,038,367 B2
(45) Date of Patent: Jun. 15, 2021

(54) POWER SUPPLY APPARATUS FOR VEHICLE

(71) Applicant: HONDA MOTOR CO., LTD., Tokyo (JP)

(72) Inventor: Toshihiro Sone, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 137 days.

(21) Appl. No.: 16/280,070

(22) Filed: Feb. 20, 2019

(65) Prior Publication Data

US 2019/0260217 A1 Aug. 22, 2019

(30) Foreign Application Priority Data

Feb. 22, 2018 (JP) .............................. JP2018-029729

(51) Int. Cl.
*H02J 7/00* (2006.01)
*H02J 7/34* (2006.01)
*B60L 58/20* (2019.01)
*B60L 50/60* (2019.01)

(52) U.S. Cl.
CPC .............. *H02J 7/342* (2020.01); *B60L 50/66* (2019.02); *B60L 58/20* (2019.02); *H02J 7/007* (2013.01); *H02J 7/0047* (2013.01); *B60L 2210/10* (2013.01); *B60L 2240/547* (2013.01); *B60L 2240/549* (2013.01)

(58) Field of Classification Search
CPC ....................................................... H02J 7/342
USPC ......................................................... 320/103
See application file for complete search history.

(56) References Cited

U.S. PATENT DOCUMENTS

| 7,336,002 B2 * | 2/2008 | Kato | ................... F02N 11/0866 |
| | | | 307/10.6 |
| 2009/0211826 A1 * | 8/2009 | Hashimoto | ............ B60K 6/365 |
| | | | 180/65.275 |
| 2010/0065349 A1 * | 3/2010 | Ichikawa | ................ H02M 1/10 |
| | | | 180/65.1 |

(Continued)

FOREIGN PATENT DOCUMENTS

| JP | 2007-008403 | 1/2007 |
| JP | 2008-306823 | 12/2008 |

(Continued)

OTHER PUBLICATIONS

Japanese Office Action for Japanese Patent Application No. 2018-029729 dated Aug. 13, 2019.

*Primary Examiner* — Yalkew Fantu
(74) *Attorney, Agent, or Firm* — Amin, Turocy & Watson, LLP (57) ABSTRACT

A vehicle electric power supply apparatus includes: a first battery that supplies electric power to a first load that is driven at a first voltage and a second load that is driven at a second voltage which is lower than the first voltage; a second battery that supplies electric power to the second load and that has a lower output voltage than that of the first battery; a DC/DC converter that reduces a voltage value of the first battery and that supplies electric power to the second load; and a control part that controls a state of supplying electric power of the first battery to the second load by controlling an operation of the DC/DC converter based on a charging rate of the first battery and a charging rate of the second battery.

7 Claims, 5 Drawing Sheets

(56) References Cited

U.S. PATENT DOCUMENTS

2010/0141213 A1\* 6/2010 Iida .................. B60L 58/12
                                                  320/134
2013/0124029 A1\* 5/2013 Izumi ................ H02J 7/00
                                                  701/22

FOREIGN PATENT DOCUMENTS

| JP | 2013-090486 | 5/2013 |
| JP | 2015-220772 | 12/2015 |
| JP | 2015-233390 | 12/2015 |
| JP | 2016-146698 | 8/2016 |
| JP | 2017-171005 | 9/2017 |
| JP | 2017-216796 | 12/2017 |
| JP | 2018-012371 | 1/2018 |

\* cited by examiner

POWER SUPPLY APPARATUS FOR VEHICLE

CROSS-REFERENCE TO RELATED APPLICATION

Priority is claimed on Japanese Patent Application No. 2018-029729, filed on Feb. 22, 2018, the contents of which are incorporated herein by reference.

BACKGROUND

Field of the Invention

The present invention relates to a vehicle electric power supply apparatus.

Background

A travel battery that supplies electric power to a vehicle drive motor and an auxiliary machine battery are mounted on a vehicle such as a hybrid vehicle and an electric automobile. A DC-DC converter supplies electric power to an auxiliary machine from the travel battery. The auxiliary machine battery functions as an electric power buffer.

In the related art, it is disclosed that an electric unit includes a DC/DC converter that generates a voltage for a vehicle control electric power supply in addition to an air conditioner, an inverter, and a PDU as a high-voltage electric device (for example, refer to Japanese Patent Application, Publication No. 2007-8403A). In order to charge a low-voltage battery for a vehicle control, an auxiliary machine operation, and the like by using a high-voltage electric power that is generated by a motor generator, the DC/DC converter decreases the generated voltage to a prescribed voltage (for example, 12V) of the low-voltage battery.

SUMMARY

However, in the related art, an output capacity that matches a total (continuous maximum) electric power of low-voltage auxiliary machines is required for the DC/DC converter that decreases the generated voltage to the prescribed voltage of the low-voltage battery, and there is a possibility that an increase in size or cost of the DC/DC converter may occur when the load (usage electric power) of the low-voltage auxiliary machine is increased.

An object of an aspect of the present invention is to provide a vehicle electric power supply apparatus capable of preventing an increase in size or cost of a DC/DC converter even when a load (usage electric power) of a low-voltage auxiliary machine is increased.

(1) A vehicle electric power supply apparatus according to an aspect of the present invention includes: a first battery that supplies electric power to a first load that is driven at a first voltage and a second load that is driven at a second voltage which is lower than the first voltage; a second battery that supplies electric power to the second load and that has a lower output voltage than that of the first battery; a DC/DC converter that reduces a voltage value of the first battery and that supplies electric power to the second load; and a control part that controls a state of supplying electric power of the first battery to the second load by controlling an operation of the DC/DC converter based on a charging rate of the first battery and a charging rate of the second battery.

(2) In the vehicle electric power supply apparatus described in the above (1), the control part may control the operation of the DC/DC converter such that the charging rate of the first battery and the charging rate of the second battery are decreased in accordance with driving of a vehicle while maintaining a difference between the charging rate of the first battery and the charging rate of the second battery in a predetermined range.

(3) In the vehicle electric power supply apparatus described in the above (2), the control part may stop an electric power supply from the first battery to the second load and supply electric power from the second battery to the second load by performing a control such that the operation of the DC/DC converter is stopped when the charging rate of the second battery is higher than the charging rate of the first battery and when a difference between the charging rate of the second battery and the charging rate of the first battery is equal to or more than a first threshold value, and the control part may start supplying electric power of the first battery to the second load by performing a control such that the operation of the DC/DC converter is started when the difference between the charging rate of the second battery and the charging rate of the first battery is equal to or less than a second threshold value that is less than the first threshold value.

(4) In the vehicle electric power supply apparatus described in the above (2), the control part may start supplying electric power of the first battery to the second load by performing a control such that the operation of the DC/DC converter is started when the charging rate of the second battery is lower than the charging rate of the first battery and when a difference between the charging rate of the second battery and the charging rate of the first battery is equal to or more than a third threshold value, and the control part may stop an electric power supply from the first battery to the second load and start supplying electric power from the second battery to the second load by performing a control such that the operation of the DC/DC converter is stopped when the difference between the charging rate of the second battery and the charging rate of the first battery is equal to or less than a fourth threshold value that is less than the third threshold value.

(5) In the vehicle electric power supply apparatus described in any one of the above (1) to (4), the first battery and the second battery may be constituted of the same type of battery, and a total capacity of the second battery may be smaller than a total capacity of the first battery.

(6) In the vehicle electric power supply apparatus described in any one of the above (1) to (5), an upper limit or a lower limit of the charging rate of the second battery may be set such that an output voltage of the second battery is within a voltage range in which the second load is operable.

(7) In the vehicle electric power supply apparatus described in any one of the above (1) to (6), when a vehicle is charged by an external electric power source, the first battery and the second battery may be charged.

According to an aspect of the present invention, it is possible to provide a vehicle electric power supply apparatus capable of preventing an increase in size or cost of the DC/DC converter even when a load (usage electric power) of a low-voltage auxiliary machine is increased.

DESCRIPTION OF THE EMBODIMENTS

Next, a vehicle electric power supply apparatus 1 of the present embodiment is described with reference to the drawings. The embodiment described below is merely an example, and the embodiment to which the present invention is applied is not limited to the embodiment described below.

In all of the drawings describing the embodiment, components having the same function are referred to by the same reference sign, and redundant description of the components is omitted.

The term "based on XX" means "based on at least XX" and also includes a case based on another element in addition to XX. Further, the term "based on XX" is not limited to a case of using XX directly and also includes a case based on one obtained by applying a calculation or a process on XX.

The "XX" is an arbitrary element (for example, arbitrary information).

The vehicle electric power supply apparatus 1 according to the embodiment of the present application is provided on an electric vehicle. The electric vehicle includes an electric automobile, a hybrid vehicle, a fuel cell vehicle, and the like. The electric automobile is driven using a battery as a power source. The hybrid vehicle is driven using a battery and an internal combustion engine as a power source. The fuel cell vehicle is driven using a fuel cell as a drive source.

Figure 1:
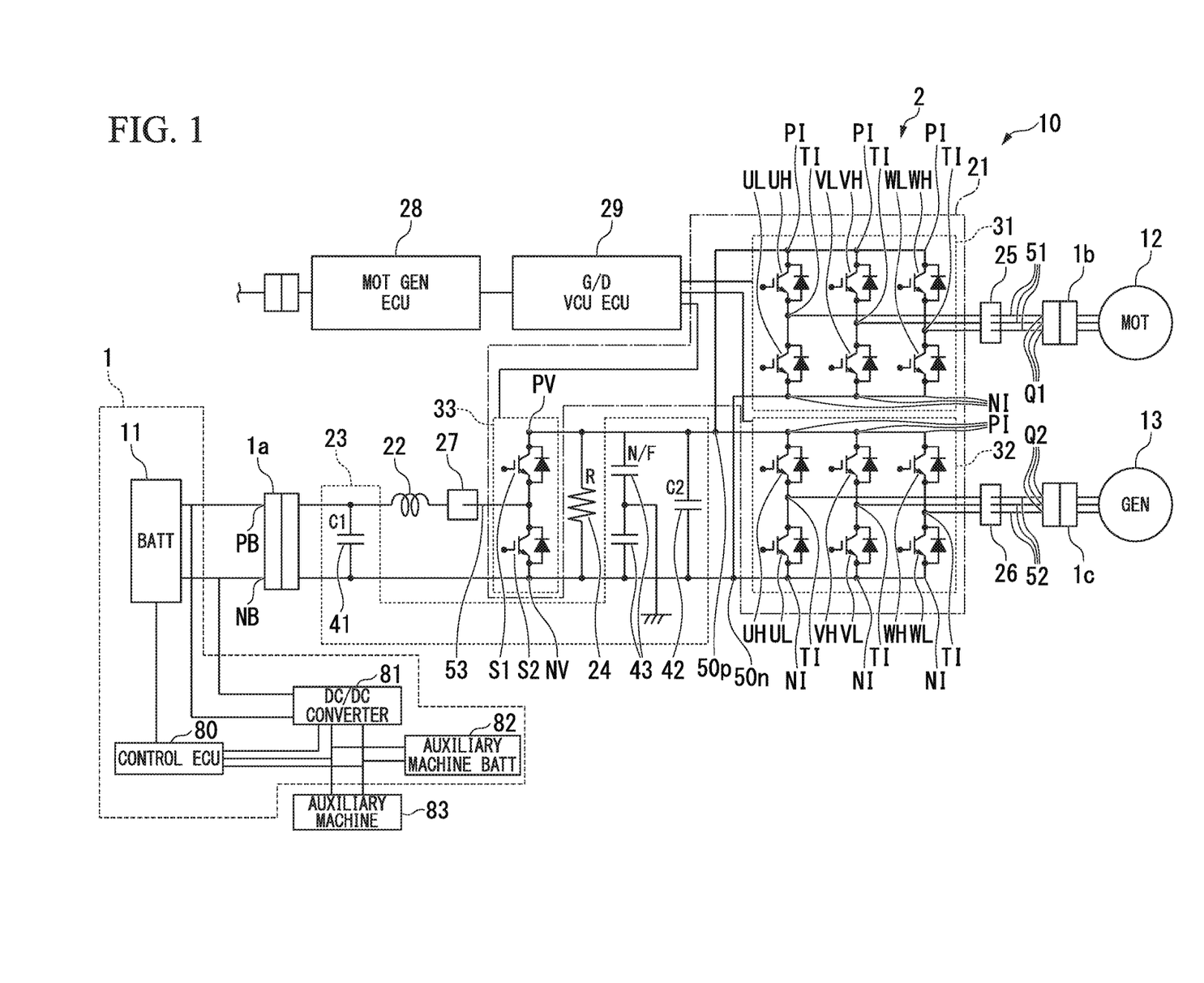
FIG. 1 is a view showing a configuration of part of a vehicle that includes a vehicle electric power supply apparatus according to an embodiment of the present invention.

FIG. 1 is a view showing a configuration of part of a vehicle 10 that includes the vehicle electric power supply apparatus 1 according to the embodiment of the present invention.

<Vehicle 10>

As shown in FIG. 1, the vehicle 10 includes an electric power conversion apparatus 2, a first motor 12 (MOT) for travel drive, a second motor 13 (GEN) for electric power generation, and an auxiliary machine 83 in addition to the vehicle electric power supply apparatus 1.

<Vehicle Electric Power Supply Apparatus 1>

The vehicle electric power supply apparatus 1 includes a battery 11 (BATT), a control ECU 80, a DC/DC converter 81, and an auxiliary machine battery 82 (auxiliary machine BATT).

The battery 11 includes a battery case and a plurality of battery modules that are accommodated inside the battery case. The battery module includes a plurality of battery cells that are connected in series. The battery 11 includes a positive terminal PB and a negative terminal NB that are connected to a DC connector 1a of the electric power conversion apparatus 2. Each of the positive terminal PB and the negative terminal NB is connected to each of a positive terminal end and a negative terminal end of the plurality of battery modules that are connected in series inside the battery case. The battery 11 is charged when the vehicle 10 is charged by an external electric power source.

The first motor 12 generates a rotation drive force (power running operation) by electric power that is supplied from the battery 11. The second motor 13 generates electric power by a rotation drive force that is input to a rotation shaft. The second motor 13 has a configuration in which a rotation power of the internal combustion engine is transmittable to the second motor 13. For example, each of the first motor 12 and the second motor 13 is a brushless DC motor of a three-phase AC. The three-phase consists of a U-phase, a V-phase, and a W-phase. Each of the first motor 12 and the second motor 13 is an inner rotor type. Each of the first motor 12 and the second motor 13 includes a rotator having a field permanent magnet and a stator having a three-phase stator winding wire for generating a rotation magnetic field that allows the rotator to be rotated. The three-phase stator winding wire of the first motor 12 is connected to a first three-phase connector 1b of the electric power conversion apparatus 2. The three-phase stator winding wire of the second motor 13 is connected to a second three-phase connector 1c of the electric power conversion apparatus 2.

The DC/DC converter 81 and the electric power conversion apparatus 2 are connected to the battery 11 in parallel. The DC/DC converter 81 reduces the voltage of the high-voltage electric power that is supplied from the battery 11 to a prescribed voltage (for example, 12V) of the auxiliary machine battery 82 in order to charge the auxiliary machine battery 82 that supplies electric power to the auxiliary machine 83. The DC/DC converter 81 supplies the electric power having the reduced voltage to the auxiliary machine battery 82.

The auxiliary machine battery 82 (auxiliary machine BATT) includes a battery case and a plurality of battery modules that are accommodated inside the battery case. The battery module includes a plurality of battery cells that are connected in series. The auxiliary machine battery 82 is constituted of the same type of battery as the battery 11. A total capacity of the auxiliary machine battery 82 is smaller than a total capacity of the battery 11. The auxiliary machine battery 82 has a charge-discharge cycle tolerability similar to that of the battery 11. The auxiliary machine battery 82 supplies electric power that has a reduced voltage and that is supplied from the DC/DC converter 81 to the auxiliary machine 83. The auxiliary machine battery 82 is charged when the vehicle 10 is charged by an external electric power source.

Each of the control ECU 80, the auxiliary machine battery 82, and the auxiliary machine 83 is connected to the DC/DC converter 81 in parallel. The auxiliary machine battery 82 is used as an electric power source for the control ECU 80 and the auxiliary machine 83.

The control ECU 80 is a software function unit that functions, for example, by executing a predetermined program by a processor such as a CPU (Central Processing Unit). The software function unit is an ECU (Electronic Control Unit) that includes a processor such as a CPU, a ROM (Read-Only Memory) that stores a program, a RAM (Random-Access Memory) that temporarily stores data, and electronic circuitry such as a timer. At least part of the control ECU 80 may be an integrated circuit such as an LSI (Large-Scale Integration).

The control ECU 80 monitors a charge residual amount (SOC: State Of Charge) of the battery 11 and a charge residual amount of the auxiliary machine battery 82. The control ECU 80 controls an operation of the DC/DC converter 81 on the basis of the charge residual amount of the battery 11 and the charge residual amount of the auxiliary machine battery 82. The control ECU 80 controls the DC/DC converter 81 such that the charge residual amount of the battery 11 and the charge residual amount of the auxiliary machine battery 82 are decreased in accordance with driving of the vehicle 10 while a difference between the charge residual amount of the battery 11 and the charge residual amount of the auxiliary machine battery 82 is maintained in a predetermined range. The range of the SOC in which the auxiliary machine battery 82 is able to be used and the range of the SOC in which the battery 11 is able to be used are described.

Figure 2:
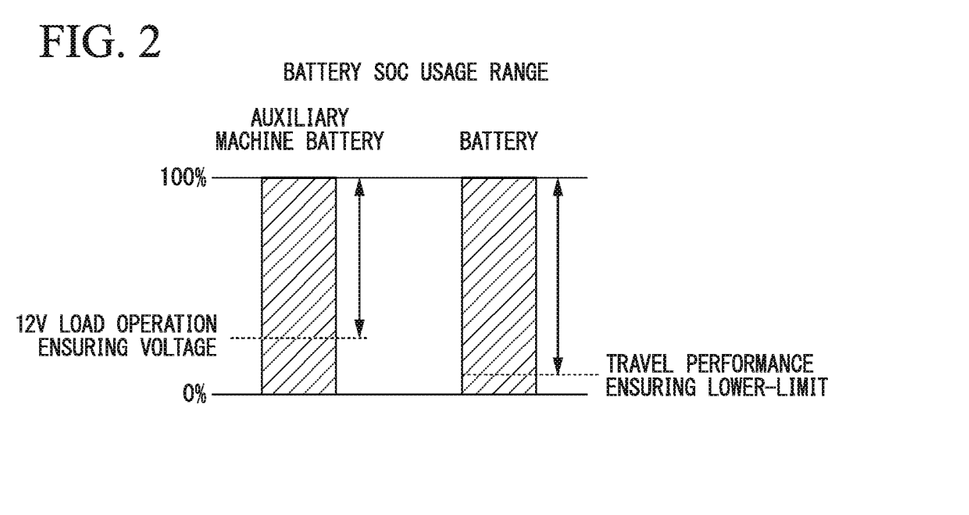
FIG. 2 is a view describing a battery and an auxiliary battery that are mounted on the vehicle electric power supply apparatus according to the embodiment of the present invention.

FIG. 2 is a view describing the battery 11 and the auxiliary battery 82 that are mounted on the vehicle electric power supply apparatus 1 according to the embodiment of the present invention. When the SOC of the auxiliary machine battery 82 is in a range from a SOC by which a voltage that ensures the operation of a 12 V load (auxiliary machine) is able to be obtained to 100%, it is possible to use the auxiliary machine battery 82. For example, the voltage that ensures the operation of the 12 V load is 12 V-13 V or more. That is, the auxiliary machine battery 82 is used in a range in which the SOC of the auxiliary machine battery 82 is from the SOC by which the voltage that ensures the operation of the 12 V load (auxiliary machine 83) is able to be obtained to 100%.

When the SOC of the battery 11 is in a range from a lower-limit SOC that is capable of ensuring a travel performance of the vehicle 10 to 100%, it is possible to use the battery 11. That is, the battery 11 is used in a range in which the SOC of the battery 11 is from the lower-limit SOC that is capable of ensuring the travel performance of the vehicle 10 to 100%.

Figure 3:
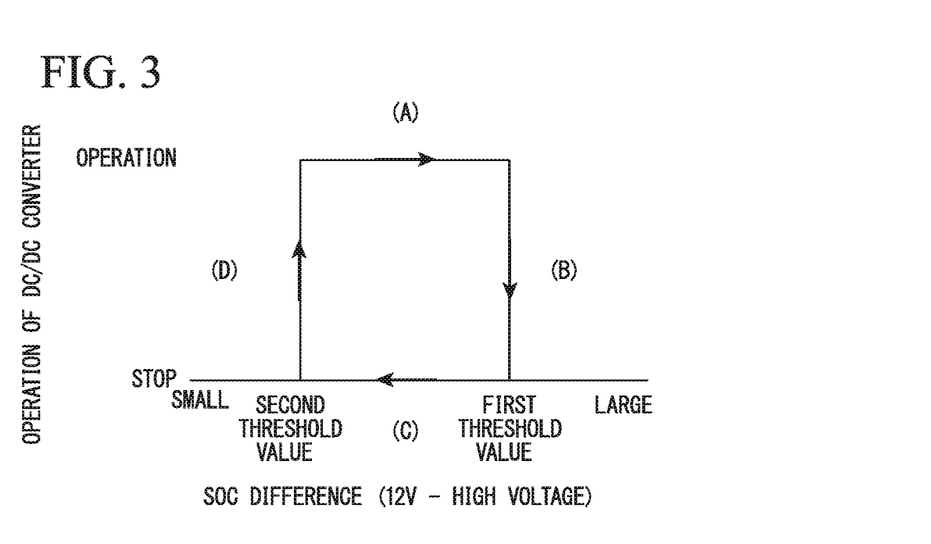
FIG. 3 is a view showing an operation of the vehicle electric power supply apparatus according to the embodiment of the present invention.

FIG. 3 is a view showing an operation of the vehicle electric power supply apparatus 1 according to the embodiment of the present invention.

The control ECU 80 monitors the SOC of the battery 11 and the SOC of the auxiliary machine battery 82 and acquires information indicating the SOC of the battery 11 and information indicating the SOC of the auxiliary machine battery 82. The control ECU 80 derives the difference (the SOC of the auxiliary machine battery 82—the SOC of the battery 11) between the SOC of the auxiliary machine battery 82 and the SOC of the battery 11 on the basis of the acquired information indicating the SOC of the battery 11 and the acquired information indicating the SOC of the auxiliary machine battery 82.

In a case where the DC/DC converter 81 is operated (A), when the difference between the SOC of the auxiliary machine battery 82 and the SOC of the battery 11 becomes equal to or more than a first threshold value, the control ECU 80 stops the operation of the DC/DC converter 81 (B). In a case where the DC/DC converter 81 is stopped (C), when the difference between the SOC of the auxiliary machine battery 82 and the SOC of the battery 11 becomes equal to or less than a second threshold value, the control ECU 80 starts the operation of the DC/DC converter 81 (D). Description is continued with reference back to FIG. 1.

<Electric Power Conversion Apparatus>

The electric power conversion apparatus 2 includes a power module 21, a reactor 22, a condenser unit 23, a resistor 24, a first current sensor 25, a second current sensor 26, a third current sensor 27, an electronic control unit 28 (MOT GEN ECU), and a gate drive unit 29 (G/D VCU ECU).

The power module 21 includes a first electric power conversion circuit part 31, a second electric power conversion circuit part 32, and a third electric power conversion circuit part 33. The first electric power conversion circuit part 31 is connected to the three-phase stator winding wire of the first motor 12 by the first three-phase connector 1b. The first electric power conversion circuit part 31 converts a DC electric power that is input via the third electric power conversion circuit part 33 from the battery 11 into a three-phase AC electric power. The second electric power conversion circuit part 32 is connected to the three-phase stator winding wire of the second motor 13 by the second three-phase connector 1c. The second electric power conversion circuit part 32 converts a three-phase AC electric power that is input from the second motor 13 into a DC electric power. It is possible to supply the DC electric power that is converted by the second electric power conversion circuit part 32 to at least one of the battery 11 and the first electric power conversion circuit part 31.

Each of the first electric power conversion circuit part 31 and the second electric power conversion circuit part 32 includes a bridge circuit that is formed of a plurality of switching elements that are connected by a bridge connection. For example, the switching element is a transistor such as an IGBT (Insulated-Gate Bipolar Transistor) or a MOSFET (Metal-Oxide-Semiconductor Field-Effect Transistor). For example, in the bridge circuit, a pair of high-side arm and low-side arm U-phase transistors UH, UL, a pair of high-side arm and low-side arm V-phase transistors VH, VL, and a pair of high-side arm and low-side arm W-phase transistors WH, WL are connected by the bridge connection. In the present embodiment, in each of the U-phase, the V-phase, and the W-phase, the high-side arm and low-side arm transistors (for example, the U-phase high-side arm transistor UH and the U-phase low-side arm transistor UL) are arranged adjacent to each other in a first direction D1.

A collector of each of the high-side arm transistors UH, VH, WH is connected to a positive terminal PI and constitutes a high-side arm. In each phase, each positive terminal PI of the high-side arm is connected to a positive bus bar 50p.

An emitter of each of the low-side arm transistors UL, VL, WL is connected to a negative terminal NI and constitutes a low-side arm. In each phase, each negative terminal NI of the low-side arm is connected to a negative bus bar 50n.

In each phase, an emitter of each of the high-side arm transistors UH, VH, WH is connected to a collector of each of the low-side arm transistors UL, VL, WL at a connection point TI.

In each phase of the first electric power conversion circuit part 31, the connection point TI is connected to a first input/output terminal Q1 by a first bus bar 51. The first input/output terminal Q1 is connected to the first three-phase connector 1b. The connection point TI of each phase of the first electric power conversion circuit part 31 is connected to the stator winding wire of each phase of the first motor 12 via the first bus bar 51, the first input/output terminal Q1, and the first three-phase connector 1*b*.

In each phase of the second electric power conversion circuit part 32, the connection point TI is connected to a second input/output terminal Q2 by a second bus bar 52. The second input/output terminal Q2 is connected to the second three-phase connector 1*c*. The connection point TI of each phase of the second electric power conversion circuit part 32 is connected to the stator winding wire of each phase of the second motor 13 via the second bus bar 52, the second input/output terminal Q2, and the second three-phase connector 1*c*. The bridge circuit includes a diode that is connected between the collector and the emitter of each of the transistors UH, UL, VH, VL, WH, WL such that the direction from the emitter to the collector is a forward direction.

Each of the first electric power conversion circuit part 31 and the second electric power conversion circuit part 32 switches between ON (conduction) and OFF (disconnection) of the pair of transistors of each phase on the basis of a gate signal as a switching command that is input to a gate of each of the transistors UH, VH, WH, UL, VL, WL from the gate drive unit 29. The first electric power conversion circuit part 31 supplies AC U-phase, V-phase, and W-phase currents to the three-phase stator winding wire by converting DC electric power that is input via the third electric power conversion circuit part 33 from the battery 11 and sequentially commutating electric power distribution to the three-phase stator winding wire of the first motor 12. The second electric power conversion circuit part 32 converts three-phase AC electric power that is output from the three-phase stator winding wire of the second motor 13 into DC electric power by the ON (conduction)/OFF (disconnection) drive of the pair of the transistors of each phase that is synchronized with the rotation of the second motor 13.

The third electric power conversion circuit part 33 is a voltage control unit (VCU). The third electric power conversion circuit part 33 includes a pair of high-side arm and low-side arm switching elements. For example, the third electric power conversion circuit part 33 includes a high-side arm first transistor S1 and a low-side arm second transistor S2. A collector of the first transistor S1 is connected to a positive terminal PV and constitutes a high-side arm. The positive terminal PV of the high-side arm is connected to the positive bus bar 50*p*. An emitter of the second transistor S2 is connected to a negative terminal NV and constitutes a low-side arm. The negative terminal NV of the low-side arm is connected to the negative bus bar 50*n*. An emitter of the high-side arm first transistor S1 is connected to a collector of the low-side arm second transistor S2. The third electric power conversion circuit part 33 includes a diode that is connected between the collector and the emitter of each of the first transistor S1 and the second transistor S2 such that the direction from the emitter to the collector is a forward direction.

A connection point between the high-side arm first transistor S1 and the low-side arm second transistor S2 is connected to the reactor 22 by a third bus bar 53. One end of the reactor 22 is connected to the connection point between the first transistor S1 and the second transistor S2, and the other end of the reactor 22 is connected to the positive terminal PB of the battery 11. The reactor 22 includes a coil and a temperature sensor that detects a temperature of the coil. The temperature sensor is connected to the electronic control unit 28 by a signal line.

The third electric power conversion circuit part 33 switches between ON (conduction) and OFF (disconnection) of the pair of transistors on the basis of a gate signal as a switching command that is input to a gate of each of the first transistor S1 and the second transistor S2 from the gate drive unit 29.

In a voltage increase time, the third electric power conversion circuit part 33 alternately switches between a first state in which the second transistor S2 is set to ON (conduction), and the first transistor S1 is set to OFF (disconnection) and a second state in which the second transistor S2 is set to OFF (disconnection), and the first transistor S1 is set to ON (conduction). In the first state, a current flows sequentially through the positive terminal PB of the battery 11, the reactor 22, the second transistor S2, and the negative terminal NB of the battery 11, and the reactor 22 is excited by DC excitation and accumulates a magnetic energy. In the second state, a voltage (induction voltage) is generated between both ends of the reactor 22 so as to prevent a change in a magnetic flux arising from the current that flows through the reactor 22 being disconnected. The induction voltage by the magnetic energy that is accumulated in the reactor 22 is superimposed on the battery voltage, and an increased voltage that is higher than an inter-terminal voltage of the battery 11 is applied between the positive terminal PV and the negative terminal NV of the third electric power conversion circuit part 33.

In a regeneration time, the third electric power conversion circuit part 33 alternately switches between the second state and the first state. In the second state, a current flows sequentially through the positive terminal PV of the third electric power conversion circuit part 33, the first transistor S1, the reactor 22, and the positive terminal PB of the battery 11, and the reactor 22 is excited by DC excitation and accumulates a magnetic energy. In the first state, a voltage (induction voltage) is generated between both ends of the reactor 22 so as to prevent a change in a magnetic flux arising from the current that flows through the reactor 22 being disconnected. The induction voltage by the magnetic energy that is accumulated in the reactor 22 is decreased, and a decreased voltage that is lower than a voltage between the positive terminal PV and the negative terminal NV of the third electric power conversion circuit part 33 is applied between the positive terminal PB and the negative terminal NB of the battery 11.

The condenser unit 23 includes a first smoothing capacitor 41, a second smoothing capacitor 42, and a noise filter 43.

The first smoothing capacitor 41 is connected to and between the positive terminal PB and the negative terminal NB of the battery 11. The first smoothing capacitor 41 smooths a voltage variation that arises in accordance with an ON/OFF switching operation of the first transistor S1 and the second transistor S2 in a regeneration time of the third electric power conversion circuit part 33.

The second smoothing capacitor 42 is connected to and between the positive terminal PI and the negative terminal NI of each of the first electric power conversion circuit part 31 and the second electric power conversion circuit part 32 and is connected to and between the positive terminal PV and the negative terminal NV of the third electric power conversion circuit part 33. The second smoothing capacitor 42 is connected to a plurality of positive terminals PI, a plurality of negative terminals NI, the positive terminal PV, and the negative terminal NV via the positive bus bar 50*p* and the negative bus bar 50*n*. The second smoothing capacitor 42 smooths a voltage variation that arises in accordance with an ON/OFF switching operation of the transistors UH, UL, VH, VL, WH, WL of each of the first electric power conversion circuit part 31 and the second electric power conversion circuit part 32. The second smoothing capacitor 42 smooths a voltage variation that arises in accordance with an ON/OFF switching operation of the first transistor S1 and the second transistor S2 in a voltage increase time of the third electric power conversion circuit part 33.

The noise filter 43 is connected to and between the positive terminal PI and the negative terminal NI of each of the first electric power conversion circuit part 31 and the second electric power conversion circuit part 32 and is connected to and between the positive terminal PV and the negative terminal NV of the third electric power conversion circuit part 33. The noise filter 43 includes two capacitors that are connected to each other in series. A connection point of the two capacitors is connected to a body ground of the vehicle 10 or the like.

The resistor 24 is connected to and between the positive terminal PI and the negative terminal NI of each of the first electric power conversion circuit part 31 and the second electric power conversion circuit part 32 and is connected to and between the positive terminal PV and the negative terminal NV of the third electric power conversion circuit part 33.

The first current sensor 25 is arranged on the first bus bar 51 that connects the first input/output terminal Q1 and the connection point TI of each phase of the first electric power conversion circuit part 31 and detects a current of each of the U-phase, the V-phase, and the W-phase. The second current sensor 26 is arranged on the second bus bar 52 that connects the second input/output terminal Q2 and the connection point TI of each phase of the second electric power conversion circuit part 32 and detects a current of each of the U-phase, the V-phase, and the W-phase. The third current sensor 27 is arranged on the third bus bar 53 that connects the reactor 22 and the connection point of the first transistor S1 and the second transistor S2 and detects a current that flows through the reactor 22.

Each of the first current sensor 25, the second current sensor 26, and the third current sensor 27 is connected to the electronic control unit 28 via a signal line.

The electronic control unit 28 controls an operation of each of the first motor 12 and the second motor 13. For example, the electronic control unit 28 is a software function unit that functions by executing a predetermined program by a processor such as a CPU. The software function unit is an ECU that includes a processor such as a CPU, a ROM that stores a program, a RAM that temporarily stores data, and electronic circuitry such as a timer. At least part of the electronic control unit 28 may be an integrated circuit such as an LSI. For example, the electronic control unit 28 performs a current feedback control and the like using a current detection value of the first current sensor 25 and a current target value associated with a torque command value with respect to the first motor 12 and generates a control signal that is input to the gate drive unit 29. For example, the electronic control unit 28 performs a current feedback control and the like using a current detection value of the second current sensor 26 and a current target value associated with a regeneration command value with respect to the second motor 13 and generates a control signal that is input to the gate drive unit 29. The control signal is a signal indicating a timing by which an ON (conduction)/OFF (disconnection) drive of the transistors UH, VH, WH, UL, VL, WL of each of the first electric power conversion circuit part 31 and the second electric power conversion circuit part 32 is performed. For example, the control signal is a pulse-width-modulated signal or the like.

The gate drive unit 29 generates a gate signal for actually performing an ON (conduction)/OFF (disconnection) drive of the transistors UH, VH, WH, UL, VL, WL of each of the first electric power conversion circuit part 31 and the second electric power conversion circuit part 32 on the basis of the control signal that is received from the electronic control unit 28. For example, the gate drive unit 29 performs amplification of the control signal, level shift, and the like and generates the gate signal.

The gate drive unit 29 generates a gate signal for performing an ON (conduction)/OFF (disconnection) drive of each of the first transistor S1 and the second transistor S2 of the third electric power conversion circuit part 33. For example, the gate drive unit 29 generates a gate signal having a duty ratio associated with a voltage increase command in a voltage increase time of the third electric power conversion circuit part 33 or a voltage decrease command in a regeneration time of the third electric power conversion circuit part 33. The duty ratio is a ratio of the first transistor S1 and the second transistor S2.

Next, a process of the vehicle electric power supply apparatus 1 of the present embodiment is described in detail with reference to FIG. 4 and FIG. 5.

Figure 4:
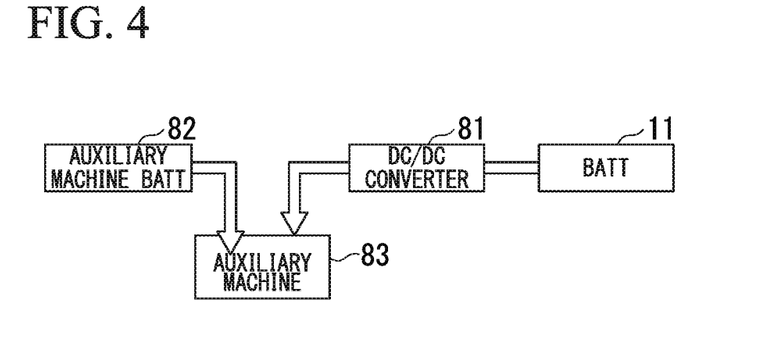
FIG. 4 is a view showing a process of the vehicle electric power supply apparatus according to the embodiment of the present invention.

FIG. 4 is a view showing a process of the vehicle electric power supply apparatus 1 according to the embodiment of the present invention.

Figure 5:
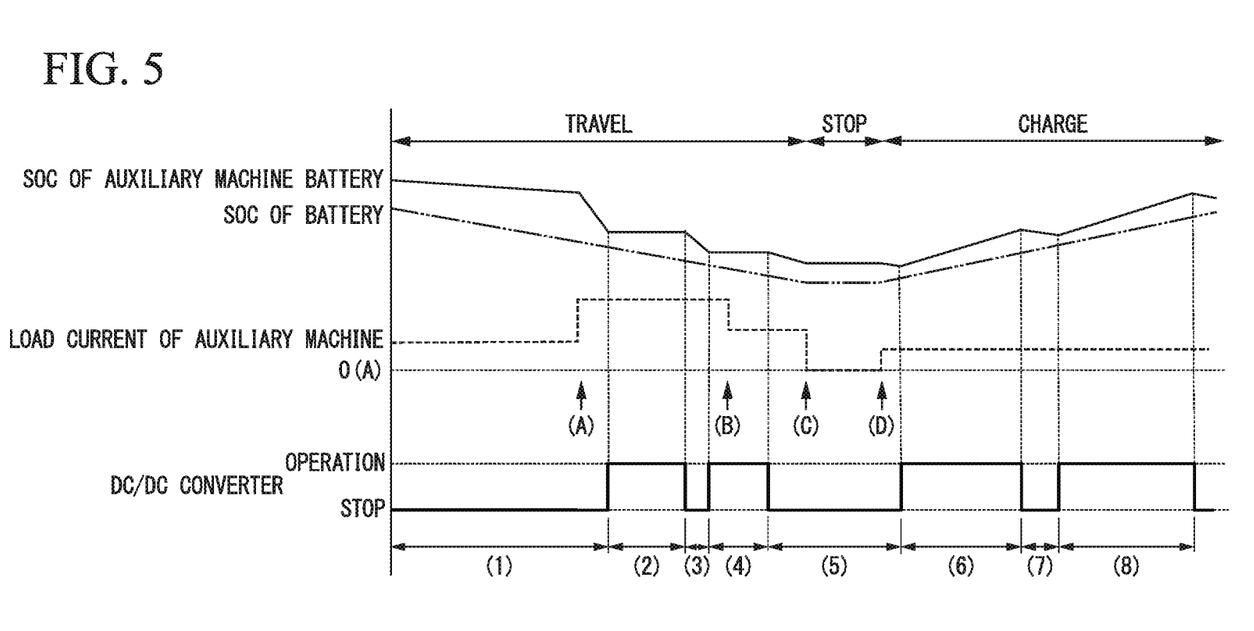
FIG. 5 shows an example of a charge-discharge characteristic of the battery and the auxiliary battery of the vehicle electric power supply apparatus according to the embodiment of the present invention.

FIG. 5 shows an example of a charge-discharge characteristic of the battery 11 and the auxiliary battery 82 of the vehicle electric power supply apparatus 1 according to the embodiment of the present invention. FIG. 5 also shows a load current characteristic of the auxiliary machine 83 and an ON/OFF characteristic of the DC/DC converter 81 in addition to the charge-discharge characteristic of the battery 11 and the auxiliary battery 82 of the vehicle electric power supply apparatus 1. In FIG. 5, the horizontal axis represents time. The points (A)-(D) shown in the load current characteristic of the auxiliary machine 83 represent a changing point of the load current characteristic. Here, the process of the vehicle electric power supply apparatus 1 is divided into a time range indicated by (1) to a time range indicated by (8) and is described. In a period of time from the time range indicated by (1) to the changing point (C) included in the time range indicated by (5), the vehicle 10 is traveling. In a period of time from the changing point (C) included in the time range indicated by (5) to the changing point (D) included in the time range indicated by (5), the vehicle 10 is stopping. In a period of time from the changing point (D) included in the time range indicated by (5) to the time range indicated by (8), charging is performed.

An operation in the time range indicated by (1) of FIG. 5 is described.

In the time range indicated by (1), the SOC of the auxiliary machine battery 82 is higher than the SOC of the battery 11, and the difference between the SOC of the auxiliary machine battery 82 and the SOC of the battery 11 is equal to or more than the second threshold value and is equal to or less than the first threshold value. In this case, by stopping the operation of the DC/DC converter 81, the battery 11 stops an electric power supply to the auxiliary machine 83, and the auxiliary machine battery 82 supplies electric power to the auxiliary machine 83. As a result, the SOC of the auxiliary machine battery 82 and the SOC of the battery 11 are decreased in accordance with driving of the vehicle 10 while the difference between the SOC of the auxiliary machine battery 82 and the SOC of the battery 11 is maintained to be equal to or more than the second threshold value and be equal to or less than the first threshold value.

Further, in the range indicated by (1), from a time point indicated by the changing point (A), a load current of the auxiliary machine battery 82 is increased. Accordingly, from the time point indicated by the changing point (A), the SOC of the auxiliary machine battery 82 is drastically decreased. In the range indicated by (1), the difference between the SOC of the auxiliary machine battery 82 and the SOC of the battery 11 is maintained to be equal to or more than the second threshold value and be equal to or less than the first threshold value.

An operation in the range indicated by (2) of FIG. 5 is described.

In the range indicated by (2), the SOC of the auxiliary machine battery 82 is higher than the SOC of the battery 11, and the difference between the SOC of the auxiliary machine battery 82 and the SOC of the battery 11 becomes equal to or less than the second threshold value. In this case, the control ECU 80 starts the DC/DC converter 81. By the DC/DC converter 81 being started, the DC/DC converter 81 reduces the voltage of the high-voltage electric power that is supplied by the battery 11 to the prescribed voltage (12V) of the auxiliary machine battery 82 and supplies the electric power having the reduced voltage to the auxiliary machine 83. The auxiliary machine battery 82 stops the supply of electric power to the auxiliary machine 83. As a result, the SOC of the auxiliary machine battery 82 is maintained, and the SOC of the battery 11 is decreased. This state is continued until the difference between the SOC of the auxiliary machine battery 82 and the SOC of the battery 11 becomes equal to or more than the first threshold value.

An operation in the range indicated by (3) of FIG. 5 is described.

In the time range indicated by (3), the SOC of the auxiliary machine battery 82 is higher than the SOC of the battery 11, and the difference between the SOC of the auxiliary machine battery 82 and the SOC of the battery 11 becomes equal to or more than the first threshold value. In this case, the control ECU 80 stops the DC/DC converter 81. By the DC/DC converter 81 stopping the operation, the battery 11 stops an electric power supply to the auxiliary machine 83, and the auxiliary machine battery 82 supplies electric power to the auxiliary machine 83. As a result, the charging rate of the auxiliary machine battery 82 and the charging rate of the battery 11 are decreased in accordance with driving of the vehicle 10 while the difference between the SOC of the auxiliary machine battery 82 and the SOC of the battery 11 is maintained to be equal to or more than the second threshold value and be equal to or less than the first threshold value.

An operation in the range indicated by (4) of FIG. 5 is described.

In the range indicated by (4), the SOC of the auxiliary machine battery 82 is higher than the SOC of the battery 11, and the difference between the SOC of the auxiliary machine battery 82 and the SOC of the battery 11 becomes equal to or less than the second threshold value. In this case, the control ECU 80 starts the DC/DC converter 81. By the DC/DC converter 81 being started, the DC/DC converter 81 reduces the voltage of the high-voltage electric power that is supplied by the battery 11 to the prescribed voltage (12V) of the auxiliary machine battery 82 and supplies the electric power having the reduced voltage to the auxiliary machine 83. The auxiliary machine battery 82 stops the supply of electric power to the auxiliary machine 83. As a result, the SOC of the auxiliary machine battery 82 is maintained, and the SOC of the battery 11 is decreased. In the range indicated by (4), from the time point indicated by the changing point (B), the load current of the auxiliary machine 83 is decreased. Accordingly, from the time point indicated by the changing point (B), the degree of decrease in the SOC of the battery 11 becomes small. This state is continued until the difference between the SOC of the auxiliary machine battery 82 and the SOC of the battery 11 becomes more than the first threshold value.

An operation in the range indicated by (5) of FIG. 5 is described.

In the time range indicated by (5), the SOC of the auxiliary machine battery 82 is higher than the charging rate of the battery 11, and the difference between the charging rate of the auxiliary machine battery 82 and the charging rate of the battery 11 becomes equal to or more than the first threshold value. In this case, the control ECU 80 stops the DC/DC converter 81. By the DC/DC converter 81 stopping the operation, the battery 11 stops an electric power supply to the auxiliary machine 83, and the auxiliary machine battery 82 supplies electric power to the auxiliary machine 83. As a result, the SOC of the auxiliary machine battery 82 and the SOC of the battery 11 are decreased in accordance with driving of the vehicle 10 while the difference between the SOC of the auxiliary machine battery 82 and the SOC of the battery 11 is maintained to be equal to or more than the second threshold value and be equal to or less than the first threshold value.

In the range indicated by (5), at the time point indicated by the changing point (C), the vehicle 10 is stopped, and therefore, the electric power supply from the battery 11 and the auxiliary machine battery 82 is stopped. Accordingly, from the time point indicated by the changing point (C), the SOC of the battery 11 and the SOC of the auxiliary machine battery 82 are maintained. Further, in the range indicated by (5), at the time point indicated by the changing point (D), the charging of the vehicle 10 is started, and the electric power supply from the auxiliary machine battery 82 to the auxiliary machine 83 is started. Accordingly, from the time point indicated by the changing point (D), the SOC of the battery 11 is increased, and the SOC of the auxiliary machine battery 82 is decreased. Further, by the charging of the vehicle 10 being started, the charging to the battery 11 is also started.

An operation in the range indicated by (6) of FIG. 5 is described.

In the range indicated by (6), the SOC of the auxiliary machine battery 82 is higher than the SOC of the battery 11, and the difference between the SOC of the auxiliary machine battery 82 and the SOC of the battery 11 becomes equal to or less than the second threshold value. In this case, the control ECU 80 starts the DC/DC converter 81. By the DC/DC converter 81 being started, the DC/DC converter 81 reduces the voltage of the high-voltage electric power that is supplied by the battery 11 to the prescribed voltage (12V) of the auxiliary machine battery 82 and supplies the electric power having the reduced voltage to the auxiliary machine 83. The auxiliary machine battery 82 stops the supply of electric power to the auxiliary machine 83. As a result, the degree of increase in the SOC of the auxiliary machine battery 82 becomes large, and the degree of increase in the SOC of the battery 11 becomes small. This state is continued until the difference between the charging rate of the auxiliary machine battery 82 and the charging rate of the battery 11 becomes equal to or more than the first threshold value.

An operation in the range indicated by (7) of FIG. 5 is described.

In the time range indicated by (7), the SOC of the auxiliary machine battery 82 is higher than the SOC of the battery 11, and the difference between the SOC of the auxiliary machine battery 82 and the SOC of the battery 11 becomes more than the first threshold value. In this case, the control ECU 80 stops the DC/DC converter 81. By the DC/DC converter 81 stopping the operation, the battery 11 stops an electric power supply to the auxiliary machine 83, and the auxiliary machine battery 82 supplies electric power to the auxiliary machine 83. As a result, the SOC of the auxiliary machine battery 82 is decreased, and the degree of increase in the SOC of the battery 11 becomes large. This state is continued until the difference between the SOC of the auxiliary machine battery 82 and the SOC of the battery 11 becomes equal to or less than the second threshold value.

An operation in the range indicated by (8) of FIG. 5 is described.

In the range indicated by (8), the SOC of the auxiliary machine battery 82 is higher than the SOC of the battery 11, and the difference between the SOC of the auxiliary machine battery 82 and the SOC of the battery 11 becomes equal to or less than the second threshold value. In this case, the control ECU 80 starts the DC/DC converter 81. By the DC/DC converter 81 being started, the DC/DC converter 81 reduces the voltage of the high-voltage electric power that is supplied by the battery 11 to the prescribed voltage (12V) of the auxiliary machine battery 82 and supplies the electric power having the reduced voltage to the auxiliary machine 83. The auxiliary machine battery 82 stops the supply of electric power to the auxiliary machine 83. As a result, the degree of increase in the SOC of the auxiliary machine battery 82 becomes large, and the degree of increase in the SOC of the battery 11 becomes small. This state is continued until the difference between the SOC of the auxiliary machine battery 82 and the SOC of the battery 11 becomes equal to or more than the first threshold value.

<Operation of Vehicle Electric Power Supply Apparatus>

Figure 6:
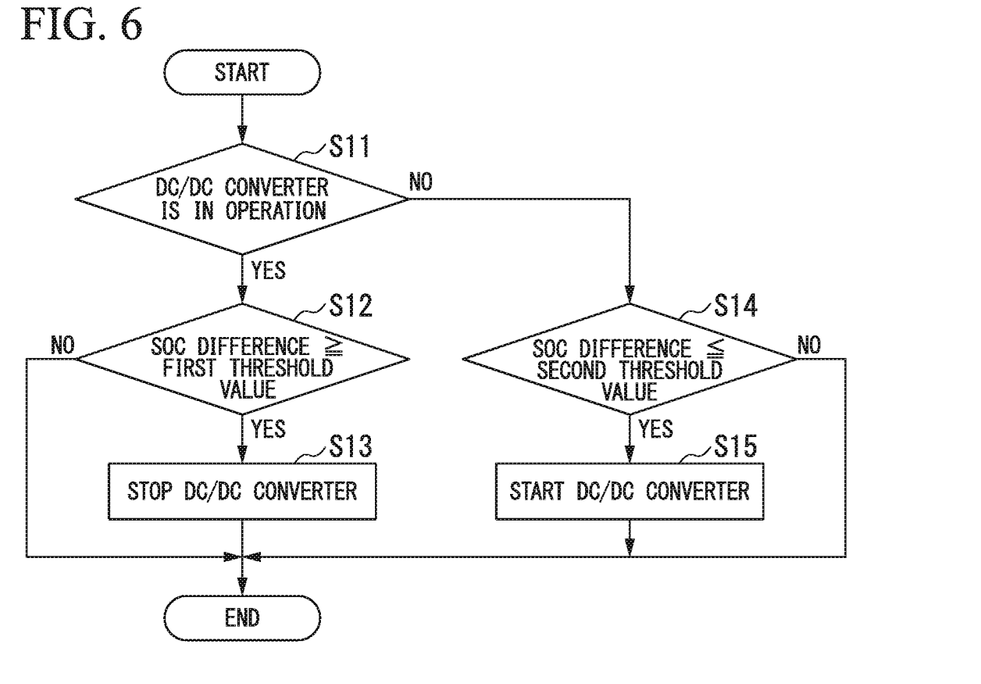
FIG. 6 is a flowchart showing an example of an operation of the vehicle electric power supply apparatus according to the embodiment of the present invention.

FIG. 6 is a flowchart showing an example of an operation of the vehicle electric power supply apparatus 1 according to the embodiment of the present invention. FIG. 6 mainly shows an operation of the control ECU 80.

(Step S11)

The control ECU 80 determines whether or not the DC/DC converter 81 is in operation. When it is determined that the DC/DC converter 81 is in operation, the routine proceeds to Step S12. When it is determined that the DC/DC converter 81 is stopping, the routine proceeds to Step S14.

(Step S12)

The control ECU 80 acquires the SOC of the battery 11 and the SOC of the auxiliary machine battery 82 and derives the difference (SOC difference) between the SOC of the auxiliary machine battery 82 and the SOC of the battery 11 on the basis of the acquired SOC of the battery 11 and the acquired SOC of the auxiliary machine battery 82. The control ECU 80 determines whether or not the difference between the SOC of the auxiliary machine battery 82 and the SOC of the battery 11 is equal to or more than the first threshold value. When the SOC difference is equal to or more than the first threshold value, the routine proceeds to Step S13. When the SOC difference is less than the first threshold value, the routine is finished.

(Step S13)

When the SOC difference is equal to or more than the first threshold value, the control ECU 80 stops the DC/DC converter 81. By stopping the operation of the DC/DC converter 81, the battery 11 stops the electric power supply to the auxiliary machine 83, and the auxiliary machine battery 82 supplies electric power to the auxiliary machine 83. As a result, the charging rate of the auxiliary machine battery 82 and the charging rate of the battery 11 are decreased in accordance with driving of the vehicle 10 while the difference between the charging rate of the auxiliary machine battery 82 and the charging rate of the battery 11 is maintained to be equal to or more than the second threshold value and be equal to or less than the first threshold value.

(Step S14)

The control ECU 80 acquires the SOC of the battery 11 and the SOC of the auxiliary machine battery 82 and derives the difference (SOC difference) between the SOC of the auxiliary machine battery 82 and the SOC of the battery 11 on the basis of the acquired SOC of the battery 11 and the acquired SOC of the auxiliary machine battery 82. The control ECU 80 determines whether or not the difference between the SOC of the auxiliary machine battery 82 and the SOC of the battery 11 is equal to or less than the second threshold value. When the SOC difference is equal to or less than the second threshold value, the routine proceeds to Step S15. When the SOC difference is more than the second threshold value, the routine is finished.

(Step S15)

When the SOC difference is equal to or less than the second threshold value, the control ECU 80 starts the DC/DC converter 81. By starting the operation of the DC/DC converter 81, the DC/DC converter 81 reduces the voltage of the high-voltage electric power that is supplied by the battery 11 to the prescribed voltage (12V) of the auxiliary machine battery 82 and supplies the electric power having the reduced voltage to the auxiliary machine 83. The auxiliary machine battery 82 stops the supply of electric power to the auxiliary machine 83. As a result, the SOC of the auxiliary machine battery 82 is maintained, and the SOC of the battery 11 is decreased. This state is continued until the difference between the charging rate of the auxiliary machine battery 82 and the charging rate of the battery 11 becomes equal to or more than the second threshold value.

The above embodiment is described using an example in which electric power is supplied from the auxiliary machine battery 82 to the control ECU 80; however, the embodiment is not limited thereto. For example, electric power may be supplied from the battery 11 to the auxiliary machine battery 82.

The above embodiment is described using an example in which the SOC of the auxiliary machine battery 82 is higher than the SOC of the battery 11; however, the embodiment is not limited thereto. For example, the invention can be also applied to a case in which the SOC of the auxiliary machine battery 82 is lower than the SOC of the battery 11. In this case, by controlling such that the operation of the DC/DC converter 81 is started when the difference between the SOC of the auxiliary machine battery 82 and the SOC of the battery 11 is equal to or more than a third threshold value, the supply of electric power of the battery 11 to the auxiliary machine 83 is started. Further, by controlling such that the operation of the DC/DC converter 81 is stopped when the difference between the SOC of the auxiliary machine battery 82 and the SOC of the battery 11 is equal to or less than a fourth threshold value that is less than the third threshold value, the electric power supply from the battery 11 to the auxiliary machine 83 is stopped, and the supply of electric power from the auxiliary machine battery 82 to the auxiliary machine 83 is started.

Figure 7:
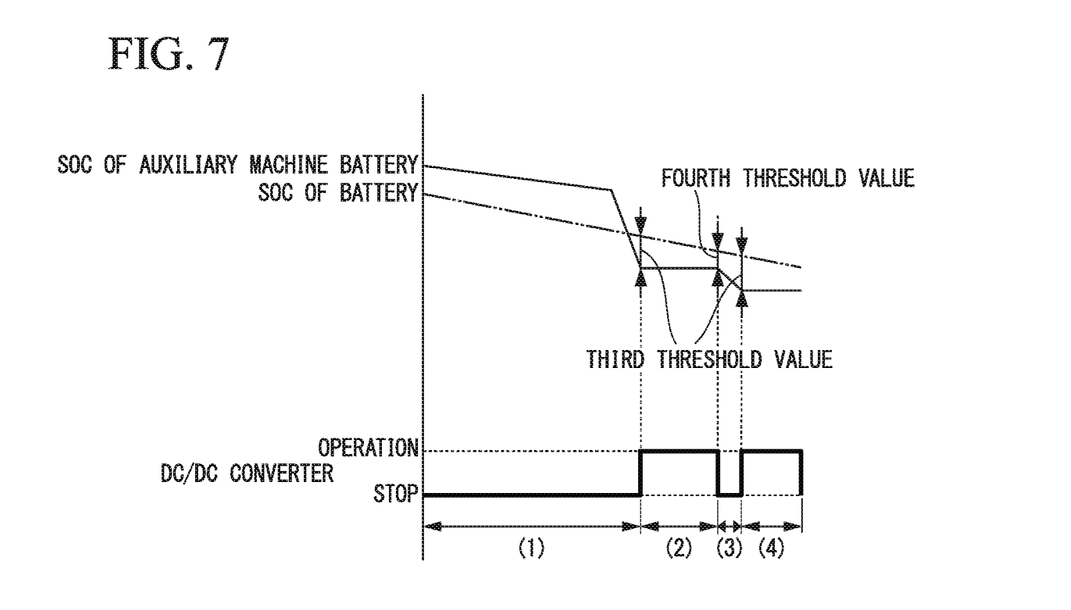
FIG. 7 is a view showing a process of the vehicle electric power supply apparatus according to the embodiment of the present invention.

FIG. 7 shows an example of a charge-discharge characteristic of the battery 11 and the auxiliary battery 82 of the vehicle electric power supply apparatus 1 according to the embodiment of the present invention. FIG. 7 also shows an ON/OFF characteristic of the DC/DC converter 81 in addition to the charge-discharge characteristic of the battery 11 and the auxiliary battery 82 of the vehicle electric power supply apparatus 1. In FIG. 7, the horizontal axis represents time. Here, the process of the vehicle electric power supply apparatus 1 is divided into a time range indicated by (1) to a time range indicated by (4) and is described. In a period of time from the time range indicated by (1) to the time range indicated by (4), the vehicle 10 is traveling.

An operation in the time range indicated by (1) of FIG. 7 is described.

In the time range indicated by (1), the SOC of the auxiliary machine battery 82 is higher than the SOC of the battery 11. In this case, by stopping the operation of the DC/DC converter 81, the battery 11 stops an electric power supply to the auxiliary machine 83, and the auxiliary machine battery 82 supplies electric power to the auxiliary machine 83. As a result, the difference between the SOC of the auxiliary machine battery 82 and the SOC of the battery 11 is decreased, and as the time elapses, the SOC of the battery 11 becomes higher than the SOC of the auxiliary machine battery 82.

An operation in the time range indicated by (2) of FIG. 7 is described.

In the range indicated by (2), the SOC of the battery 11 is higher than the SOC of the auxiliary machine battery 82, and the difference between the SOC of the battery 11 and the SOC of the auxiliary machine battery 82 becomes equal to or more than the third threshold value. In this case, the control ECU 80 starts the DC/DC converter 81. By the DC/DC converter 81 being started, the DC/DC converter 81 reduces the voltage of the high-voltage electric power that is supplied by the battery 11 to the prescribed voltage (12V) of the auxiliary machine battery 82 and supplies the electric power having the reduced voltage to the auxiliary machine 83. The auxiliary machine battery 82 stops the supply of electric power to the auxiliary machine 83. As a result, the SOC of the auxiliary machine battery 82 is maintained, and the SOC of the battery 11 is decreased. This state is continued until the difference between the SOC of the auxiliary machine battery 82 and the SOC of the battery 11 becomes equal to or less than the fourth threshold value that is less than the third threshold value.

An operation in the range indicated by (3) of FIG. 7 is described.

In the time range indicated by (3), the SOC of the battery 11 is higher than the SOC of the auxiliary machine battery 82, and the difference between the SOC of the battery 11 and the SOC of the auxiliary machine battery 82 becomes equal to or less than the fourth threshold value. In this case, the control ECU 80 stops the DC/DC converter 81. By stopping the operation of the DC/DC converter 81, the battery 11 stops an electric power supply to the auxiliary machine 83, and the auxiliary machine battery 82 supplies electric power to the auxiliary machine 83. As a result, the charging rate of the auxiliary machine battery 82 and the charging rate of the battery 11 are decreased in accordance with driving of the vehicle 10 while the difference between the SOC of the auxiliary machine battery 82 and the SOC of the battery 11 is maintained to be more than the fourth threshold value and be less than the third threshold value.

An operation in the range indicated by (4) of FIG. 7 is described.

In the range indicated by (4), the SOC of the battery 11 is higher than the SOC of the auxiliary machine battery 82, and the difference between the SOC of the battery 11 and the SOC of the auxiliary machine battery 82 becomes equal to or more than the third threshold value. In this case, the control ECU 80 starts the DC/DC converter 81. By the DC/DC converter 81 being started, the DC/DC converter 81 reduces the voltage of the high-voltage electric power that is supplied by the battery 11 to the prescribed voltage (12V) of the auxiliary machine battery 82 and supplies the electric power having the reduced voltage to the auxiliary machine 83. The auxiliary machine battery 82 stops the supply of electric power to the auxiliary machine 83. As a result, the SOC of the auxiliary machine battery 82 is maintained, and the SOC of the battery 11 is decreased. This state is continued until the difference between the SOC of the auxiliary machine battery 82 and the SOC of the battery 11 becomes equal to or less than the fourth threshold value.

According to the embodiment, the vehicle electric power supply apparatus 1 includes: a first battery (for example, the battery 11 in the embodiment) that supplies electric power to a first load (for example, the first motor 12 for travel drive in the embodiment) that is driven at a first voltage and a second load (for example, the auxiliary machine 83 in the embodiment) that is driven at a second voltage that is lower than the first voltage; a second battery (for example, the auxiliary machine battery 82 in the embodiment) that supplies electric power to the second load and that has a lower output voltage than that of the first battery; a DC/DC converter that reduces a voltage value of the first battery and that supplies electric power to the second load; and a control part (for example, the control ECU 80 in the embodiment) that controls a state of supplying electric power of the first battery to the second load by controlling an operation of the DC/DC converter based on a charging rate (for example, the SOC of the battery 11 in the embodiment) of the first battery and a charging rate (for example, the SOC of the auxiliary machine battery 82 in the embodiment) of the second battery.

By such a configuration, although energy is supplied to a 12V load from a travel battery in the related art, energy is supplied to the auxiliary machine (12V load) from the auxiliary machine battery 82 (12V battery) in the vehicle electric power supply apparatus 1 according to the embodiment.

Figure 8:
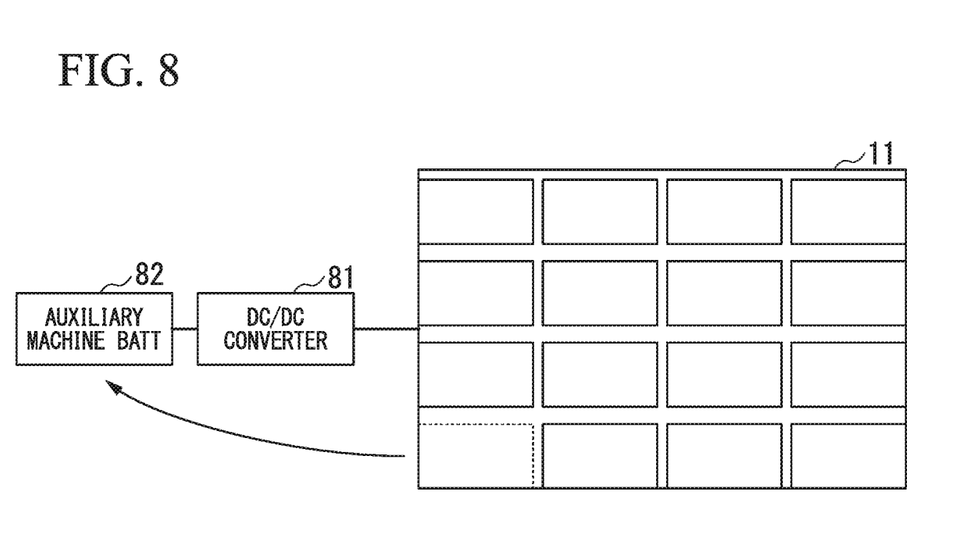
FIG. 8 is a view showing an example of an effect of the vehicle electric power supply apparatus according to the embodiment of the present invention.

FIG. 8 is a view showing an example of an effect of the vehicle electric power supply apparatus 1 according to the embodiment of the present invention. As shown in FIG. 8, the energy amount that is supplied to the auxiliary machine 83 (12V load) from the auxiliary machine battery 82 (12V battery) is not consumed from the travel battery, and therefore, it is possible to reduce the capacity of the travel battery by reducing the capacity of the travel battery 11 and replacing the reduced capacity by the auxiliary machine battery 82 (12V battery).

Further, although a capacity that is capable of dealing with a continuous maximum electric power of the load of the low-voltage auxiliary machine is required for the output capacity of the DC/DC converter in the related art, in the vehicle electric power supply apparatus 1 according to the embodiment, the output capacity of the DC/DC converter is able to be reduced to an output capacity that is only capable of maintaining the SOC of the second battery, that is, a capacity which corresponds to average electric power of the load of the low-voltage auxiliary machine, and therefore, it is not necessary for the DC/DC converter to have an output capacity that matches a total (continuous maximum) electric power of low-voltage auxiliary machines. Therefore, it is possible to prevent an increase in size or cost of the DC/DC converter even when the load (usage electric power) of the low-voltage auxiliary machine is increased.

Further, in the vehicle electric power supply apparatus 1, the control part controls the operation of the DC/DC converter such that the charging rate of the first battery and the charging rate of the second battery are decreased in accordance with driving of a vehicle while maintaining the difference between the charging rate of the first battery and the charging rate of the second battery in a predetermined range.

The vehicle electric power supply apparatus 1 is able to control such that the charging rate of each of the first battery and the second battery is decreased in accordance with driving of the vehicle while maintaining the difference between the charging rate of the first battery and the charging rate of the second battery in a predetermined range. Accordingly, the driving of the electric vehicle is continued while reducing the operation frequency of the DC/DC converter by driving the second load using the electric power of the second battery, and thereby, the charging rate of the second battery is decreased in accordance with the decrease in the SOC of the travel battery. According to such a configuration, by driving the second load using the electric power of the second battery, it is possible to continue the driving of the second load from a full-charge state (a state in which the charging rate is high) of the first battery to a state (a state in which the charging rate is low) that requires charging while reducing the operation frequency of the DC/DC converter.

Further, in the vehicle electric power supply apparatus 1, the control part stops the electric power supply from the first battery to the second load and supplies electric power from the second battery to the second load by performing a control such that the operation of the DC/DC converter is stopped when the charging rate of the second battery is higher than the charging rate of the first battery and when the difference between the charging rate of the second battery and the charging rate of the first battery is equal to or more than the first threshold value, and the control part starts supplying electric power of the first battery to the second load by performing a control such that the operation of the DC/DC converter is started when the difference between the charging rate of the second battery and the charging rate of the first battery is equal to or more than the second threshold value that is less than the first threshold value.

According to such a configuration, it is possible to control such that the charging rate of each of the first battery and the second battery is decreased in accordance with driving of the vehicle while maintaining the difference between the charging rate of the first battery and the charging rate of the second battery in a predetermined range.

Further, in the vehicle electric power supply apparatus 1, the control part starts supplying electric power of the first battery to the second load by performing a control such that the operation of the DC/DC converter is started when the charging rate of the second battery is lower than the charging rate of the first battery and when the difference between the charging rate of the second battery and the charging rate of the first battery is equal to or more than the third threshold value, and the control part stops the electric power supply from the first battery to the second load and starts supplying electric power from the second battery to the second load by performing a control such that the operation of the DC/DC converter is stopped when the difference between the charging rate of the second battery and the charging rate of the first battery is equal to or more than the fourth threshold value that is less than the third threshold value.

Further, in the vehicle electric power supply apparatus 1, the first battery and the second battery are constituted of the same type of battery, and the total capacity of the second battery is smaller than the total capacity of the first battery.

In this way, by allowing the second battery to have a charge-discharge cycle tolerability similar to that of the first battery (high-voltage battery), it is possible to prevent replacing only the second battery at a predetermined frequency.

Further, in the vehicle electric power supply apparatus 1, the upper limit or the lower limit of the charging rate of the second battery is set such that the output voltage of the second battery is within a voltage range (for example, 12 V-13 V or more in the embodiment) in which the second load is operable.

According to such a configuration, even when the charging rate of the second battery is decreased in accordance with driving of the vehicle, it is possible to maintain the charging rate of the second battery in a voltage range that is equal to or more than the operation voltage of the second load.

Further, in the vehicle electric power supply apparatus 1, when the vehicle is charged by an external electric power source, the first battery and the second battery are charged.

The auxiliary machine battery 82 may be accommodated in the battery case in which the battery 11 is accommodated together with the battery 11. Further, in addition to the auxiliary machine battery 82, the DC/DC converter 81 may be also accommodated in the battery case in which the battery 11 is accommodated.

Although the embodiments have been described, the embodiments are examples, and the invention is not limited to the embodiments. The embodiments can be implemented as a variety of other embodiments, and a variety of omissions, replacements, changes, and combinations can be made without departing from the scope of the invention. The embodiments are included in the scope of the invention and also included in the invention described in the claims and equivalents thereof.

What is claimed is:

1. A vehicle electric power supply apparatus, comprising:
   a first battery that supplies electric power to a first motor that is driven at a first voltage and an auxiliary machine that is driven at a second voltage which is lower than the first voltage;
   a second battery that supplies electric power to the auxiliary machine and that has a lower output voltage than that of the first battery;
   a DC/DC converter that reduces a voltage value of the first battery and that supplies electric power to the auxiliary machine; and
   a control part that controls an operation of the DC/DC converter based on a charging rate of the first battery and a charging rate of the second battery;
   wherein the control part firstly determines whether or not the DC/DC converter is in operation,
   the control part sets a predetermined threshold value based on the determined operating state of the DC/DC converter,
   the control part acquires a SOC difference that is a difference between state of charge of the first battery and state of charge of the second battery, and
   the control part controls whether or not an electric power of the first battery is supplied to the auxiliary machine by controlling the operation of the DC/DC converter based on a result of comparing the SOC difference and the predetermined threshold value.

2. The vehicle electric power supply apparatus according to claim 1, wherein the control part controls the operation of the DC/DC converter such that the charging rate of the first battery and the charging rate of the second battery are decreased in accordance with driving of a vehicle while maintaining a difference between the charging rate of the first battery and the charging rate of the second battery in a predetermined range.

3. The vehicle electric power supply apparatus according to claim 2,
wherein the control part stops an electric power supply from the first battery to the auxiliary machine and supplies electric power from the second battery to the auxiliary machine by performing a control such that the operation of the DC/DC converter is stopped when the charging rate of the second battery is higher than the charging rate of the first battery and when a difference between the charging rate of the second battery and the charging rate of the first battery is equal to or more than a first threshold value, and
the control part starts supplying electric power of the first battery to the auxiliary machine by performing a control such that the operation of the DC/DC converter is started when the difference between the charging rate of the second battery and the charging rate of the first battery is equal to or less than a second threshold value that is less than the first threshold value.

4. The vehicle electric power supply apparatus according to claim 2,
wherein the control part starts supplying electric power of the first battery to the auxiliary machine by performing a control such that the operation of the DC/DC converter is started when the charging rate of the second battery is lower than the charging rate of the first battery and when a difference between the charging rate of the second battery and the charging rate of the first battery is equal to or more than a third threshold value, and
the control part stops an electric power supply from the first battery to the auxiliary machine and starts supplying electric power from the second battery to the auxiliary machine by performing a control such that the operation of the DC/DC converter is stopped when the difference between the charging rate of the second battery and the charging rate of the first battery is equal to or less than a fourth threshold value that is less than the third threshold value.

5. The vehicle electric power supply apparatus according to claim 1,
wherein the first battery and the second battery are constituted of the same type of battery, and
a total capacity of the second battery is smaller than a total capacity of the first battery.

6. The vehicle electric power supply apparatus according to claim 1,
wherein an upper limit or a lower limit of the charging rate of the second battery is set such that an output voltage of the second battery is within a voltage range in which the auxiliary machine is operable.

7. The vehicle electric power supply apparatus according to claim 1,
wherein when a vehicle is charged by an external electric power source, the first battery and the second battery are charged.

* * * * *